June 30, 1953          L. P. HUNTER          2,644,139

MULTIFREQUENCY T-R BOX

Filed Dec. 27, 1947

WITNESSES:
Edward Michaels
Rev. C. Groove

INVENTOR
Lloyd P. Hunter.
BY F. W. Lyle.
ATTORNEY

Patented June 30, 1953

2,644,139

UNITED STATES PATENT OFFICE 2,644,139

MULTIFREQUENCY T-R BOX

Lloyd P. Hunter, Oak Ridge, Tenn., assignor to Westinghouse Electric Corporation, East Pittsburgh, Pa., a corporation of Pennsylvania Application December 27, 1947, Serial No. 794,147

8 Claims. (Cl. 333—13)

My invention relates to so-called T-R boxes; that is to say, circuit control devices which are adapted to maintain one circuit normally in energy-exchanging relation with a power-transmitting channel, and to shunt said circuit out of such energy-exchanging relation when the energy being transmitted through said channel exceeds a certain predetermined value in intensity. One well known use of T-R boxes is to connect a wave-guide traversed by received pulses to the receiver in a radar system, but to disconnect the receiver from the transmitter which is connected to the same wave-guide whenever the transmitter sends out a pulse, thereby preventing the intense radiation propagated along the guide from the transmitter from ruining the delicate and sensitive receiver equipment. Such apparatus usually takes the form of a chamber enclosing a gaseous discharge gap which remains in a substantially insulating condition as long as the energy passing through the wave-guide is below a critical intensity, but which arcs over to short-circuit the wave-guide branch leading to the receiver as soon as the above-mentioned critical value is exceeded. The T-R boxes resonate at the frequency of the carrier wave being employed. For certain purposes, it is desirable to employ such T-R boxes which are capable of resonating at two or more different frequencies; one or more of these frequencies being the carriers for radar systems and the other being the frequency of one or more radio beacon systems in conjunction with which it is desired to employ the radar systems on an aircraft or the like.

One object of my invention is, accordingly, to provide a novel type of T-R box capable of resonating at two or more different frequencies.

Another object of my invention is to provide a novel type of T-R box capable of resonating at two or more different frequencies, with the provision of means for varying each of said frequencies at will.

Still another object of my invention is to provide a novel type of chamber resonator for use in ultra-high frequency transmission systems which is capable of resonating the two different frequencies, each one of which may be varied at will over a substantial range.

Other objects of my invention will become apparent upon reading the following description taken in connection with the drawing, in which.

Figure 1:
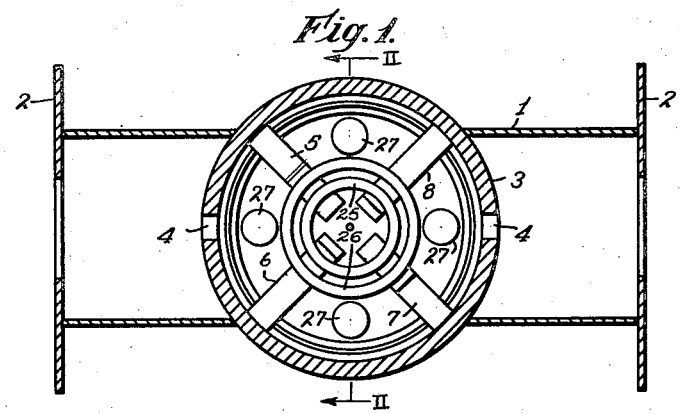
Figure 1 is a view in cross section along line I—I of Fig. 2.
Figure 2:
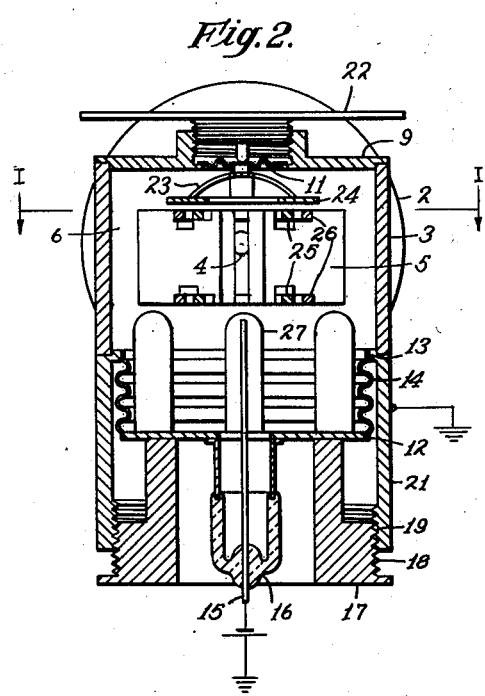
Fig. 2 is a cross-sectional view taken along lines II—II of Fig. 1, at right angles to Fig. 1, of a T-R box embodying the principles of my invention.

Referring in detail to Figs. 1 and 2, I provide a wave-guide section comprising a cylindrical wall 1 of conducting material having at its opposite ends connecting flanges 2 by which it may be attached to a wave-guide (not shown). In the central region of the cylindrical wall 1 is positioned a cylindrical casing 3 of conducting material having in its diametrically opposite sides in alignment with the axis of cylinder 3, a pair of openings 4 by which energy passing along the wave-guide section 1 may attain access to the interior of the cylinder 3. The cylinder 3 is provided with four equidistant conductive radial walls 5, 6, 7 and 8 projecting from a portion of its interior surface but leave a space both above and below them within the cylinder 3 and also gaps between their radially-inward edges. The upper end of the cylinder 3 has a metallic closing plate 9, a central portion of which comprises a flexible diaphragm 11 of a type well known in the art. The lower end of the cylinder 3 is closed by a metal plate 12 which is connected to the walls of the cylinder 3 at a ledge 13 by a flexible metal corrugated member 14 of the type usually referred to by the term "Sylphon." The plate 12 has a central opening through which there projects a metallic rod 15 which is connected to the plate 12 by a hermetic seal 16 of glass or similar material which need not be described in detail here since it is of the type well known in the vacuum tube art. The end plate 12 is likewise provided with a projecting cylindrical member 17 having a screw thread 18 on its periphery which engages with a similar screw thread 19 on a cylindrical member 21 which constitutes, in effect, a downward continuation of the walls of the cylinder 3. As will be evident from a moment's inspection, the member 17 may be turned about its central axis and the screw threads 18 and 19 will thus raise or lower the end plate 12 against the compressive force of Sylphon 14, to shorten or lengthen the vertical dimension of the space within the cylinder 3. The various joints of the members engaging the cylinder walls 3 are made vacuum-tight so that the pressure inside the cylinder may be given any desired value by suitable pumping arrangements.

The top plate 9 is likewise provided with a screw-thread engagement with a member 22 having a projection bearing against the upper face of the flexible diaphragm 11. By turning the member 22, the flexible diaphragm 11 may be moved upward or downward through a limited range. The lower face of the flexible diaphragm 11 is attached to a spider 23 supporting a conducting annulus 24 which acts as one plate of a variable condenser as will be pointed out below.

Both the top and bottom of the projecting radial walls 5, 6, 7 and 8 are provided with a pair of circular conductive rings 25, 26. Each ring 25 is electrically connected to the walls 5 and 7, but the walls 6 and 8 are recessed to leave a space between their nearest surfaces and each ring 25. In a similar manner, each ring 26 is conductively connected to the walls 6, 8, but the walls 5 and 7 are recessed to maintain them out of electrical contact with each ring 26. The upper rings 25 and 26 are, however, separated from the conducting annulus 24 by a relatively short gap and form in association therewith the other plates of a pair of capacitances. Thus the upper ring 25 and the walls 5, 7 connected thereto are capacitively coupled to the conducting annulus 24 and thence capacitively coupled to the upper ring 26 and the radial walls 6, 8 to which the latter is connected.

The bottom plate 12 supports four cylindrical projections 27 which are positioned midway between the walls 5, 6, 7 and 8 and which serve to vary the resonant frequency of the four cavities within the cylinder 1 between those walls. The arrangement thus described will be seen to constitute, in effect, four chamber-type resonators, each of quadrant form, having by reason of symmetry identical resonant frequencies, and these resonators are capacitively coupled in pairs to each other through the agencies of the rings 25, 26 and the annulus 24. It will be evident that by turning the member 17, the extent of the projection of the cylinders 27 into the four resonant cavities may be varied thereby varying the tuning of said cavities simultaneously over a predetermined range; and that by turning the member 22, the capacitive coupling between the annulus 24 and the rings 25 and 26 may be varied to similarly vary the capacitive coupling between one set of opposite resonant chambers above described to the other set of opposite resonant chambers within the cylinder 3.

It can be shown that where two resonant circuits, each having an equivalent inductance L and an equivalent capacitance C, are coupled to each other by an additional capacitance C', the system will resonate at two different frequencies, one being $$W_1 = \frac{1}{2\pi\sqrt{LC}}$$

and the other being $$W_2 = \frac{1}{2\pi\sqrt{LC}}\sqrt{\frac{C}{2C'+C}}$$

where $W_1$ is the frequency of each oscillator by itself and $W_2$ varies with the magnitude of the coupling C'.

A moment's consideration will show that any quadrant resonator in Fig. 1 arrangement will have a frequency $W_1$ which may be considered to arise from an equivalent inductance L and an equivalent capacitance C; and, furthermore, that the capacitance between the two rings 25 and 26 and the annulus 24 may be considered to provide the capacitive coupling C'. The structure comprising the four quadrant resonators, the rings 25 and 26 and the annulus 24 will, accordingly, have at least two periods of oscillation corresponding to $W_1$ and $W_2$ above, and these periods may be varied over a predetermined range at will by turning the member 17. Similarly, the value of the frequency $W_2$ may be varied at will by changing the capacitance C' by turning the member 22.

I have found, as a matter of fact, that such a structure as I have described would have three different modes of vibration, one in which each cavity is 180 electrical degrees out of phase with its neighbor on each side, the second mode being one in which each cavity is 90° out of phase with its two neighbors, and the third mode being one in which all the four cavities vibrate in the same phase. However, I have found that the system tends strongly to avoid vibrations in the third mode above mentioned and that the first and second modes are the only ones likely to be met with in practice.

It can be shown that by subdividing the space inside wall 3 into $n$ similar sectors instead of into four as above described it is possible to cause the system to resonate at $$\frac{n}{2}+1$$

frequencies. The mode of operation of the above described structure as a T-R box is substantially as described below. T-R boxes are well known today in the ultra short wave art and comprise arrangements by which a wave guide is arranged to permit the passage of waves so long as their intensity is below a predetermined value but which short circuit the wave guide when the incoming wave intensity rises above the aforesaid critical value. In their conventional form such T-R boxes comprise a discharge gap between portions of opposite polarity in a resonant chamber, and this discharge gap undergoes electric breakdown when the intensity of in-coming waves exceeds a critical value. To increase its uniformity and rapidity of response, the discharge gap is provided with a keep-alive discharge between a small keep-alive electrode and a wall portion of the chamber. Section 11.5 of Radar System Engineering, Radiation Laboratory Series, McGraw-Hill, New York, 1947, describes such T-R boxes.

In applicant's arrangement, each of the quadrant resonators vibrates electrically with the inner edges of adjacent radial vanes 5, 6, 7 and 8 (e. g. vane 5 and vane 8) at different potentials so that the maximum electric stress found in the quadrant occurs at the narrow gap between such inner edges. A low intensity electric discharge is maintained in the adjacent region by a suitable auxiliary voltage source connected between the rod 15 and the casing 3. When waves below a critical intensity are transmitted along the wave guide 1 they cause the quadrant chambers above mentioned to resonate, but the electric stress in the gap between the inner ends of the radial vanes is insufficient to cause a break down of such gaps. However, when the in-coming waves are sufficiently intense, the electric stress within the resonators becomes sufficient to cause a break down of the aforesaid gaps, thereby effectively short circuiting the wave guide 1 at the first gap which the waves meet.

I claim as my invention:

1. A T-R box comprising external conductive walls defining a main cylindrical cavity, a plurality of pairs of spaced conductive radial walls separating a portion of the interior of said main cavity into sub-cavities of equal resonance frequency, the ends of said radial walls terminating adjacent each other to provide gaps between them; an inlet to said main cavity for connection to a wave guide; an outlet from said main cavity for connection to a wave guide; conductors connecting alternate radial walls to each other; and capacitive means coupling said conductors to each other, whereby at low power levels said main cavity resonates at one of a plurality of resonant frequencies depending on the frequency of the input energy and at a higher power level a discharge occurs between said radial walls.

2. A T-R box, according to claim 1, characterized by an insulated electrode projecting through the external walls of the main cavity, which electrode has an end disposed adjacent to said external walls, and by terminals for impressing a voltage between said electrode and said external walls, whereby a discharge is maintained between said electrode and said walls.

3. A T-R box, according to claim 2, characterized by means for varying the resonant tuning of the sub-cavities at will, and by means for varying at will said capacitive coupling.

4. A T-R box comprising external conductive walls defining a main cylindrical cavity; a plurality of pairs of spaced conductive radial walls separating a portion of the interior of said main cavity into sub-cavities of equal resonance frequency, the ends of said radial walls terminating adjacent each other to provide gaps between them; an inlet to said main cavity for connection to a wave guide; an outlet from said main cavity for connection to a wave guide; a first conductive member connected to alternate radial walls; a second conductive member connected to the remaining alternate radial walls; a third conductive member in capacitive relation to said first and second members; an insulated electrode projecting through said external conducting walls, said electrode having an end disposed adjacent said external walls; and terminals for impressing a voltage between said electrode and said external walls whereby a discharge is maintained between the end of said electrode and said walls and at low power levels said main cavity resonates at one of a plurality of resonant frequencies depending on the frequency of the input energy and at a higher power level a discharge occurs between said radial walls.

5. A T-R box, according to claim 4, characterized by means for varying the spacing between the third conductive member and the first and second member.

6. A T-R box, according to claim 5, characterized by means for tuning the sub-cavities.

7. A T-R box, according to claim 6, characterized by the fact that the means for varying the spacing between the third and first and second conductive members is located near one end of the main cavity and the tuning means is located near the other end of the main cavity.

8. A resonator comprising external conductive walls defining a main cylindrical chamber; a plurality of pairs of spaced conductive radial walls separating a portion of the interior of said chamber into cavities of equal resonance frequency, the ends of said walls terminating adjacent each other to provide gaps between them; an inlet port and an outlet port for said chamber; a first conductive member connected to alternate radial walls; a second conductive member connected to the remaining alternate radial walls; a third conductive member in capacitive relation to said first and second conductive members, said conductive members being all located near one end of said chamber; means for varying the spacing between said third conductive member and said first and second members at will; and means adjustable independently of said varying means and located near the other end of said chamber for tuning said sub-cavities at will.

LLOYD P. HUNTER.

References Cited in the file of this patent
UNITED STATES PATENTS

| Number | Name | Date |
|---|---|---|
| 2,408,237 | Spencer | Sept. 24, 1946 |
| 2,415,962 | Okress | Feb. 18, 1947 |
| 2,418,469 | Hagstrum | Apr. 8, 1947 |
| 2,424,496 | Nelson | July 22, 1947 |
| 2,435,984 | Spencer | Feb. 17, 1948 |
| 2,450,619 | Sonkin | Oct. 5, 1948 |
| 2,480,194 | Montgomery | Aug. 30, 1949 |
| 2,501,545 | Sproull | Mar. 21, 1950 |